United States Patent [19]

Izumiyama

[11] Patent Number: 4,827,509
[45] Date of Patent: May 2, 1989

[54] CATV RECEIVER

[75] Inventor: Tohru Izumiyama, Soma, Japan

[73] Assignee: Alps Electric Co., Ltd., Japan

[21] Appl. No.: 240,458

[22] Filed: Sep. 2, 1988

Related U.S. Application Data

[63] Continuation of Ser. No. 27,513, Mar. 18, 1987, abandoned.

[30] Foreign Application Priority Data

Jul. 2, 1986 [JP] Japan ................... 61-155487

[51] Int. Cl.⁴ .......................... H04N 1/44; H04R 1/04
[52] U.S. Cl. ............................................ 380/10; 380/15
[58] Field of Search ........................... 380/7, 10, 15, 20

[56] References Cited

U.S. PATENT DOCUMENTS

| | | | |
|---|---|---|---|
| 3,760,097 | 9/1973 | Burroughs et al. | 380/10 |
| 4,148,064 | 4/1979 | Reed | 380/7 |
| 4,523,228 | 6/1985 | Banker | 380/15 |
| 4,725,882 | 2/1988 | Sato et al. | 380/10 |

Primary Examiner—Salvatore Cangialosi
Attorney, Agent, or Firm—Guy W. Shoup; Paul J. Winters

[57] ABSTRACT

In a CATV receiver for receiving scrambled television signal, then de-scrambling it to original television signal responsive to key pulses contained in the scrambled television signal, and then outputting it at a predetermined frequency band, said receiver characterized in that an output section of the receiver is provided with a trap circuit for attenuating signals which are at frequency bands adjacent to the predetermined frequency band and that the trap circuit is made operative synchronizing with the key pulses. Even when either of the adjacent channels is selected by the common television set, therefore, the television signal at the adjacent channel cannot be picked up to thereby prevent it from being poachingly viewed on the screen of the television set.

2 Claims, 3 Drawing Sheets

CATV RECEIVER

This application is a continuation of application Ser. No. 027,513, filed Mar. 18, 1987 now abandoned.

BACKGROUND OF THE INVENTION (a) Field of the Invention

The present invention relates to a CATV receiver improved to prevent television signals from being poachingly used at those not-contracted channels adjacent to the reception-contracted channel.

(b) Prior Art

The CATV system which is used for pay television service and the like is intended to transmit television signal which has been scrambled at the CATV station, and de-scramble only the television signal, which is at the reception-contracted channel, by means of the terminal (or CATV receiver) located at the receiving home to enable the common television set to pick up the de-scrambled signal.

The conventional CATV receiver will be described referring to FIGS. 4 and 5. FIG. 4 is a circuit block diagram showing the conventional CATV receiver and FIG. 5 is a waveform diagram for explaining the operation of the receiver shown in FIG. 4. Image signal whose horizontal synchronizing portions are attenuated by about 6 dB, for example, at a period (t), as shown in FIG. 5(a) and voice signal synchronous with the attenuated portions of the image signal and upon which key pulses containing data necessary for de-scrambling are superposed, as shown in FIG. 5(b), are transmitted as a scrambled television signal from the CATV station. This television signal is inputted to a tuner section 2 through an input terminal 1, selected at a desired channel by a channel selector section 3, converted to one which is at a predetermined frequency band and picked up through an output terminal 4 of the tuner section 2. This frequency-converted television signal is divided into two by a divider 5, one of which is applied to a de-scrambler section 6 and the other to a demodulator section 7. The key pulses which have been superposed upon the voice signal are extracted, as shown in FIG. 5(c), from the frequency-converted television signal by means of the demodulator section 7 and applied to a driver section 8. The data contained in the key pulses are compared with contracted data stored in a contracted-channel setting section 9 to see whether the selected channel is contracted or not. When the channel is contracted, a pulse having a width of 10 μsec, for example, as shown in FIG. 5(d), is applied to the de-scrambler section 6 for the period (t) during which the horizontal synchronizing portions of the image signal are attenuated synchronizing with the key pulses. The de-scrambler section 6 attenuates those portions of the image signal, which are not for the period (t) during which the 10 μsec pulse is inputted, by about 6 dB (to which the horizontal synchronizing portions of the image signal have been attenuated for the scramble at the CATV station). The image signal is thus de-scrambled to the common one, as shown in FIG. 5(e). The television signal which consists of this de-scrambled image signal and the voice signal from which the key pulses have been removed, and which has been converted to have a predetermined frequency is outputted through an output terminal 10 and picked up by the common television set.

Contracted data which meet the contents of the reception contract are previously stored in the memory of the contracted channel setting section 9. It is preferable that the above-described CATV receiver enables the television signal to be picked up not at not-contracted channels but only at the contracted channel. In the case of the conventional CATV receiver, however, the television signal can be picked up even through the not-contracted channels adjacent to the contracted channel because of the following reasons.

The television signal transmitted from the CATV station through adjacent channels is often same in phase at its horizontal synchronizing portions. It is therefore likely to happen that the image signals at the adjacent channels which have been insufficiently attenuated by the tuner section 2 are de-scrambled together with the television signal, which is at the contracted channel, by means of the de-scrambler section 6 and outputted through the output terminal 10 when the reception-contracted channel is selected by the CATV receiver. When either of the adjacent channels is selected, therefore, the television set enables its signal to be poachingly picked up and imaged although it is not the contracted channel.

In order to prevent the television signals from being poachingly imaged through the adjacent channels, the tuner section 2 may be provided with a filter having so sharp a transmission characteristic (or attenuation of 50–60 dB, for example) as to sufficiently attenuate the television signals, but this makes the CATV receiver high on cost.

SUMMARY OF THE INVENTION

The present invention is therefore intended to eliminate the above-mentioned drawbacks inherent in the conventional CATV receiver. Accordingly, the object of the present invention is to provide a CATV receiver low in cost and capable of preventing the television signals from being poachingly imaged through the adjacent not-contracted channels.

This object of the present invention can be achieved by a CATV receiver wherein the scrambled television signal is received, de-scrambled to the original television signal responsive to key pulses contained therein, and outputted at a predetermined frequency band, characterized in that an output section in the receiver is provided with a trap circuit for attenuating signals at frequency bands adjacent to the predetermined frequency band and that the trap circuit is operated synchronizing with the key pulses.

The trap circuit for attenuating signals at the adjacent frequency bands is arranged at the output section in the receiver and operated synchronizing with the key pulses to de-scramble the television signal. Therefore, horizontal synchronizing portions of the frequency-converted television signals at the adjacent channels are attenuated by the trap circuit and again scrambled similarly to the case of the television signal transmitted from the CATV station, thereby making it impossible to be imaged by the common television set.

DETAILED DESCRIPTION OF THE PREFERRED EMBODIMENT

Figure 1:
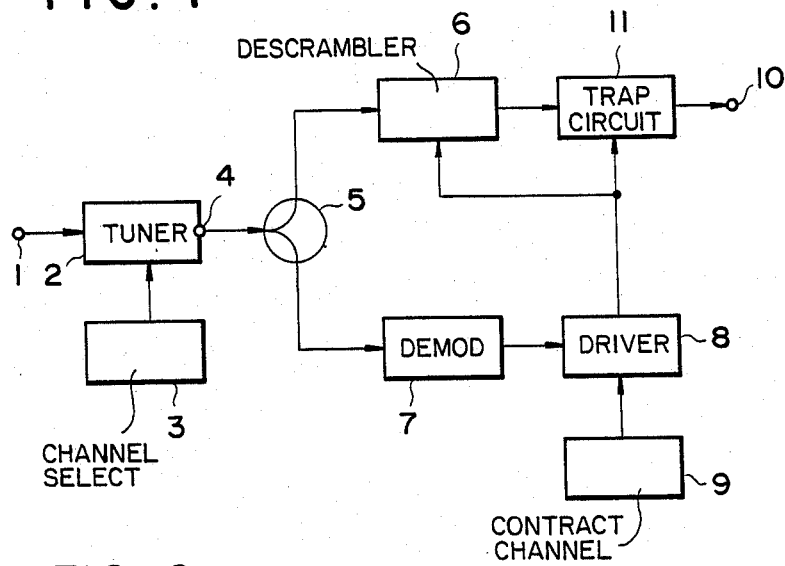
FIG. 1 is a circuit block diagram showing an example of the CATV receiver according to the present invention.
Figure 2:
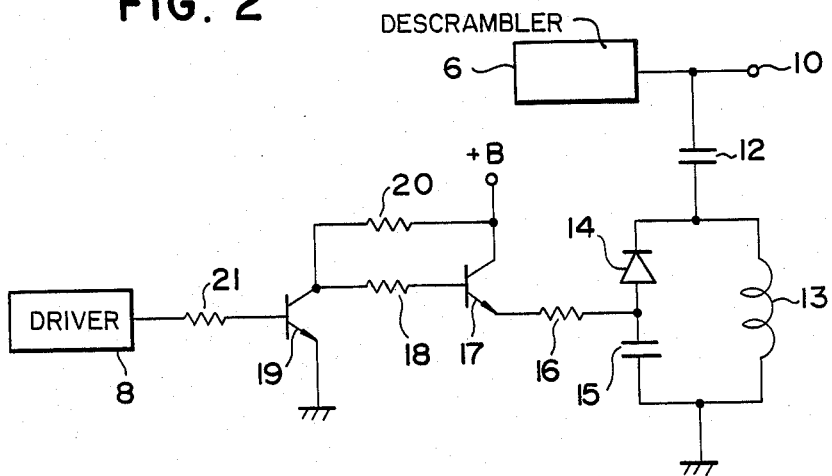
FIG. 2 is a concrete circuit diagram showing a trap circuit in FIG. 1.
Figure 3:
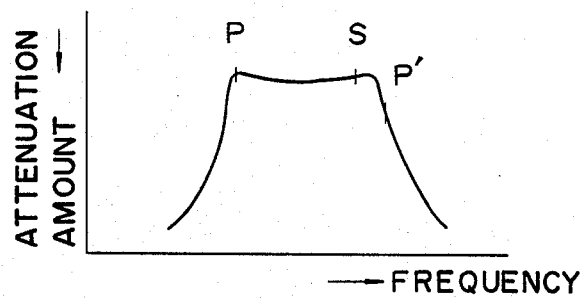
FIG. 3 shows frequency characteristics of the receiver shown in FIG. 1.
Figure 3:
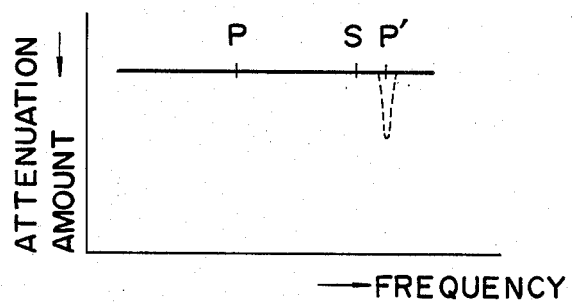
Figure 3:
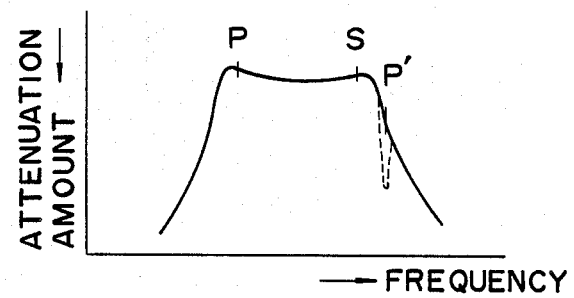

An embodiment of the present invention will be described referring to FIGS. 1 through 3. FIG. 1 is a circuit block diagram showing an example of the CATV receiver according to the present invention, FIG. 2 is a concrete circuit diagram showing a trap circuit in FIG. 1, and FIG. 3 shows frequency characteristics of the receiver shown in FIG. 1. Same block circuits in FIG. 1 as those in FIG. 4 will be represented by same reference numerals and description on these circuits will be omitted.

Figure 4:
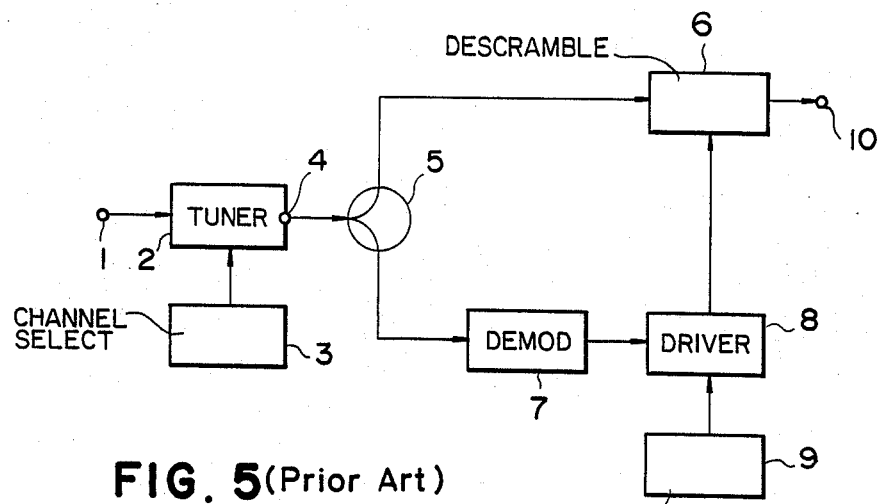
FIG. 4 is a circuit block diagram showing the conventional CATV receiver.
Figure 5:
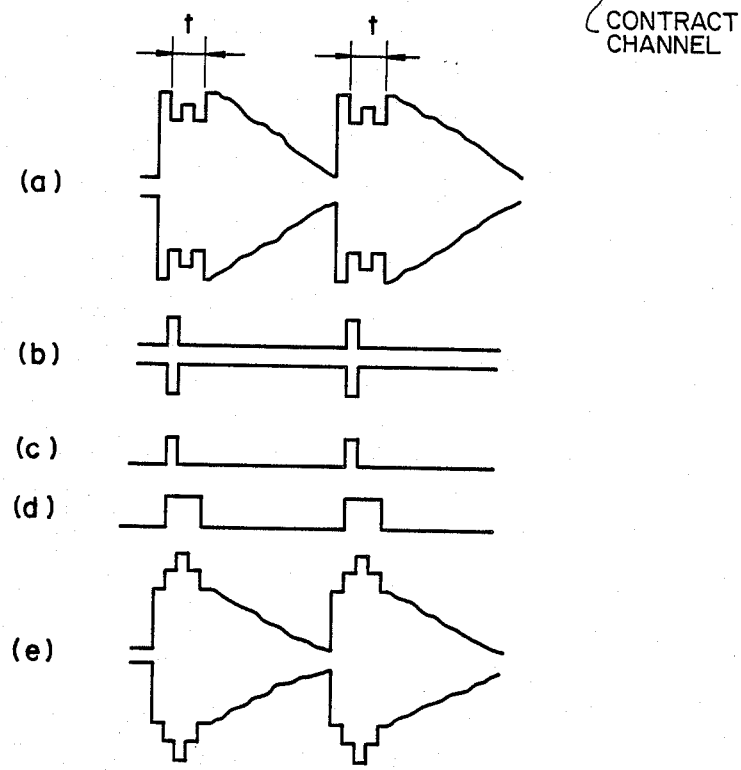
FIG. 5 is a waveform diagram showing the operation of the receiver.

FIG. 1 is different from FIG. 4 in that a trap circuit 11 is arranged at an output section of the receiver or interposed between a de-scrambler section 6 and an output terminal 10, that pulses (synchronizing with key pulses) are applied from a driver section 8 to the trap circuit 11, and that the trap circuit 11 is operated for a period during which the pulses are being applied.

The trap circuit 11 will be described referring to FIG. 2. The output terminal 10 is earthed in series through a capacitor 12 and a coil 13 in this order. These capacitor 12 and coil 13 form a series resonance circuit in which television signals at not-contracted adjacent channels resonate with frequency-converted ones at a frequency band. The connection point between the capacitor 12 and the coil 13 is earthed in series through an inversely-directed switching diode 14 and a capacitor 15. The connection point between the switching diode 14 and the capacitor 15 is connected to an emitter of a transistor 17 through a resistor 16. A collector of the transistor 17 is connected to a driving power source while a base thereof to a collector of a transistor 19 through a resistor 18. The collector of the transistor 19 is connected to the driving power source through a resistor 20, an emitter thereof is earthed and a base thereof is connected to the driver section 8 through a resistor 21.

The trap circuit 11 keeps the transistor 19 not conductive but the transistor 17 conductive when no pulse is outputted from the driver section 8, synchronizing with key pulses. Current flows in forward direction from the driving power source to the switching diode 14 through the transistor 17 which has been made conductive. The switching diode 14 is thus made conductive. When the switching diode 14 is made conductive like this, the coil 13 is short-circuited in high frequency manner and the capacitor 12 and the coil 13 do not serve as the series resonance circuit. The trap circuit 11 is thus left inoperative without attenuating any signal appearing at the output terminal 10. When a pulse synchronous with the key pulse is outputted from the driver section 8, the transistor 19 is made conductive while the transistor 17 not conductive, thereby making the switching diode 14 not conductive. Signals at the adjacent channels are thus attenuated by the series resonance circuit of the capacitor 12 and the coil 13.

When the output of the de-scrambler section 6 is viewed from the viewpoint of frequency characteristic, not only frequency-converted image signal P and voice signal S at the reception-contracted channel but also frequency-converted image signal P' at the adjacent channel are contained in the band, similarly to the case of the conventional CATV receiver, as shown in FIG. 3(A). However, the frequency characteristic of the trap circuit 11 is flat as shown by a solid line in FIG. 3(B) when the trap circuit 11 is left inoperative, but when it is operated, the frequency-converted image signal P' is attenuated as shown by a broken line in FIG. 3(B). When the output of the output terminal 10 is viewed from the viewpoint of frequency characteristic in the case of the CATV receiver of the present invention, therefore, the frequency-converted image signal P' at the adjacent channel is attenuated, as shown by a broken line in FIG. 3(C), by the operation of the trap circuit 11.

The trap circuit 11 is rendered operative synchronizing with the key pulses. Therefore, the frequency-converted television signal at the adjacent channel is attenuated at the horizontal synchronizing portions thereof and thus scrambled, similarly to the television signal which is scrambled and transmitted by the CATV station. As the result, the television signals at the adjacent channels cannot be picked up to thereby prevent them from being poachingly displayed as images even when either of the adjacent channels is selected by the common television set.

Although an example of the trap circuit 11 has been concretely shown in FIG. 2, it may be arranged so that a switching element is added in series to the series resonance circuit of the capacitor 12 and the coil 13 to enable the trap circuit 11 to be controlled by pulses which are synchronized with the key pulses. Further, it should be understood that the trap circuit is not limited to the one provided with the series resonance circuit.

According to the CATV receiver of the present invention as described above, the frequency-converted television signals at the adjacent channels are outputted after they are attenuated at their horizontal synchronizing portions. Even when either of the adjacent channels is selected by the common television set, therefore, the television signal at the adjacent channel cannot be picked up to thereby prevent it from being poachingly viewed on the screen of the television set. Further, this effect can be achieved only by the addition of the trap circuit which is operated synchronizing with the key pulses, thereby making the CATV receiver of the present invention low on cost.

I claim:

1. In a CATV receiver having an input terminal for receiving a scrambled television signal which contains a key pulse signal for descrambling the signal, a tuner section responsive to a channel selector section for generating a frequency-converted signal of a selected frequency band of the input television signal, a divider for dividing the frequency-converted band signal, a descrambler section receiving the frequency-converted band signal for descrambling it and providing an output television signal to an output terminal, a demodulator section for extracting the key pulse signal from the frequency-converted band signal, a driver section receiving the key pulse signal from the demodulator section for comparing data contained in the key pulse signal with data stored in a contracted-channel setting section and providing a restoring pulse signal to the descrambler section to enable it to descramble the frequency-converted band signal if the selected frequency-converted band corresponds to a contracted channel, the improvement comprising a trap circuit receiving the output from said descrambler section and the restoring pulse signal from said driver section and providing the output television signal to the output terminal, said trap circuit being tuned for an adjacent frequency-converted band, for attenuating an adjacent frequency-converted band signal only during a time period of the restoring pulse signal, whereby when a non-contracted, adjacent frequency-converted band signal is passed by the tuner section and descrambled by the descrambler section together with a contracted frequency-converted band signal, the trap circuit is enabled to attenuate the adjacent frequency-converted band signal to prevent its output as an output television signal.

2. A CATV receiver according to claim 1, wherein said trap circuit comprises a first capacitor having one terminal connected to a common connection between an output side of the descrambler and the output terminal, an inductor connected in series from the other terminal of the first capacitor to ground, said first capacitor and said inductor forming a series resonant circuit tuned for a frequency at which a non-contracted, adjacent frequency-converted band resonates with a contracted, frequency-converted band, a switching circuit connected in series from the other terminal of the first capacitor to ground, wherein said switching circuit is rendered conductive when no restoring pulse signal is received from said driver section, thereby short-circuiting said inductor and rendering said series resonant circuit inoperative to attenuate the output form said descrambler section, and said switching circuit is rendered non-conductive when a restoring pulse signal is received from said driver section, thereby rendering said series resonant circuit operative to attenuate the output from said descrambler section.

* * * * *